(12) United States Patent
Etuk et al.

(10) Patent No.: US 8,285,195 B2
(45) Date of Patent: *Oct. 9, 2012

(54) SYSTEM OF REWARD-BASED EDUCATION

(75) Inventors: Ntiedo M. Etuk, New York, NY (US); Robert L. Clegg, New York, NY (US)

(73) Assignee: Tabula Digita, Inc., Long Island City, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/467,892

(22) Filed: May 18, 2009

(65) Prior Publication Data

US 2009/0226871 A1     Sep. 10, 2009

Related U.S. Application Data

(63) Continuation of application No. 11/838,848, filed on Aug. 14, 2007, now abandoned, which is a continuation of application No. 10/618,348, filed on Jul. 11, 2003, now Pat. No. 7,257,367.

(60) Provisional application No. 60/395,274, filed on Jul. 11, 2002.

(51) Int. Cl.
*G09B 3/00* (2006.01)

(52) U.S. Cl. ......... 434/350; 434/322; 434/365; 705/14

(58) Field of Classification Search .............. 434/322, 434/323, 350, 365; 705/1, 14, 26
See application file for complete search history.

(56) References Cited

U.S. PATENT DOCUMENTS

| 5,025,372 | A | | 6/1991 | Burton et al. |
| 5,697,844 | A | * | 12/1997 | Von Kohorn .................... 463/40 |
| 5,716,211 | A | | 2/1998 | Vetter |
| 5,743,746 | A | | 4/1998 | Ho et al. |
| 5,788,508 | A | * | 8/1998 | Lee et al. ...................... 434/350 |
| 5,907,831 | A | | 5/1999 | Lotvin et al. |
| 6,112,181 | A | | 8/2000 | Shear et al. |
| 6,120,300 | A | | 9/2000 | Ho et al. |
| 6,178,407 | B1 | * | 1/2001 | Lotvin et al. ............... 705/14.73 |

(Continued)

FOREIGN PATENT DOCUMENTS

JP   2002002159   1/2002

OTHER PUBLICATIONS

Brees Foundation, Educational Incentive and Banking System, [online], [retrieved on May 13, 2003] Retrieved using Internet <URL: www.ciof.org/toolkits/employment/bresee/banking-system.html>.

(Continued)

*Primary Examiner* — Kesha Y. Frisby
(74) *Attorney, Agent, or Firm* — Hudnell Law Group P.C.

(57) ABSTRACT

A system and method for rewarding educational accomplishment is disclosed. In one embodiment, a method includes providing rewards to a user, such as a child, for achievement of one or more goals within an educational activity. The rewards are preferably credit in a form that is widely accepted by merchants and other entities for items, such as goods and services, that they offer. Preferably, information associating the user and items the user purchases with the credit is used to create a purchase history file for each user.

7 Claims, 4 Drawing Sheets

U.S. PATENT DOCUMENTS

| | | |
|---|---|---|
| 6,267,672 B1 | 7/2001 | Vance |
| 6,473,084 B1 | 10/2002 | Phillips et al. |
| 6,561,811 B2 | 5/2003 | Rapoza et al. |
| 6,599,131 B2 | 7/2003 | Wolfson |
| 7,203,656 B2 | 4/2007 | Lotvin et al. |
| 2001/0031456 A1 | 10/2001 | Cynaumon et al. |
| 2001/0032125 A1 | 10/2001 | Bhan et al. |
| 2001/0049084 A1 | 12/2001 | Mitry |
| 2002/0002477 A1 | 1/2002 | Fox et al. |
| 2002/0049634 A1 | 4/2002 | Longinotti |
| 2002/0055089 A1 | 5/2002 | Scheirer |
| 2002/0076674 A1 | 6/2002 | Kaplan |
| 2002/0098881 A1 | 7/2002 | Radom |
| 2002/0111854 A1 | 8/2002 | Yotam et al. |
| 2003/0059760 A1 | 3/2003 | Tojek et al. |
| 2003/0152904 A1 | 8/2003 | Doty, Jr. |
| 2003/0212636 A1 | 11/2003 | Resnick |
| 2004/0230495 A1 | 11/2004 | Lotvin et al. |
| 2005/0130112 A1 | 6/2005 | Lotvin et al. |
| 2007/0192171 A1 | 8/2007 | Lotvin et al. |

OTHER PUBLICATIONS

Book Adventure Home Page, [online], [retrieved on May 13, 2003] Retrieved from Book Adventure using Internet <URL: www.bookadventure.org>.

Pages from It Pays to Learn website, [online], [retrieved on May 13, 2003] Retrieved from It Pays to Learn using Internet <URL: www.itpaystolearn.com>.

Toyopia Home Page, [online], [retrieved on May 13, 2003] Retrieved from Toyopia using Internet <URL: www.toyopia.com>.

* cited by examiner

SYSTEM OF REWARD-BASED EDUCATION

CROSS REFERENCE TO RELATED APPLICATIONS

This application is a continuation of U.S. patent application Ser. No. 11/838,848 filed Aug. 14, 2007 now abandoned which is a continuation of U.S. patent application Ser. No. 10/618,348 filed Jul. 11, 2003 now U.S. Pat. No. 7,257,367 which claims priority to U.S. provisional application No. 60/395,274, filed Jul. 11, 2002, entitled The Education Rewards Collection System, which is hereby incorporated by reference.

BACKGROUND OF THE INVENTION

Despite efforts to increase the quality of American education, many children continue to perform poorly in school. In fact, the U.S. Department of Education has estimated that among the nation's 12th graders, 83 percent lack proficiency in mathematics.

One reason for this poor performance is lack of motivation. Many children do not exert themselves fully in classroom assignments and homework because the benefits, such as increased earnings and well-roundedness, will not be appreciated for years.

In an effort to address this problem, numerous alternatives to the traditional classroom method of learning have emerged. One such alternative is known as rewards-based education. These systems reward students upon accomplishing certain educational goals. This reinforcement is meant to motivate the students to work harder at school-related tasks.

One such system of such a system at Barton Elementary School in Chicago, Ill., where teachers reward students with "Barton Bucks" for attending class, handing in homework on time, proper uniform dress, answering test prep questions correctly, and writing exceptional essays for class. Students may spend the Barton Bucks they accumulate on "prizes" at a school store. However, the students have a limited array of awards, since they can only trade the Barton Bucks for the items the school store chooses to offer.

One way of addressing that problem would be to negotiate commitments from one or more merchants to accept the points in exchange for the goods and services they offer. However, such an arrangement still limits a participating child's point redemption options to the items those merchants offer. Additionally, merchants may be hesitant to agree to such an arrangement without a sufficient guarantee that they would be reimbursed for the items they provide.

Furthermore, that system still fails to include a mechanism for tracking and processing information regarding the items the children purchase with the points they earn. But this information has potentially great value, since it provides children's purchase histories. Such information is rarely available elsewhere, since children are generally ineligible for opening credit card or other credit-based accounts. The purchase histories could be used, for example, in targeted advertising campaigns, or sold.

SUMMARY OF THE INVENTION

The present invention is directed to a system and method for rewarding educational accomplishment. In a preferred embodiment, the present invention comprises a first party that provides an educational activity to a child student or other user, who participates in the activity. When the user achieves certain goals within the educational activity, he or she obtains points from the first party or another party. Preferably, a monetary value of the points is determined and managed in an account by a second party, such as a major credit card company or other financial entity. By employing such an arrangement, a user may purchase items, such as goods and services, at any merchant or other entity that accepts that company's credit for purchases. For example, if the financial company in the present invention is Visa, Inc., a child may purchase items with his or her account at any of the over 28 million locations that accept payment with a Visa card. This provides significant motivation to a user to achieve educationally, since the rewards provide short-term reinforcement that is user-specific—the user is provided a vast array of items from which to apply the monetary value toward purchase. Thus, the user may apply the monetary value toward items that he or she specifically desires.

Additionally, the second party in such an arrangement is provided valuable information associating the user with the user's purchases. This information provides incentive to an entity to become the second party in the present invention. This information may be used, for example, in targeted advertising campaigns, or sold. The information is especially valuable where the users are children, since children are ineligible for most credit accounts, and thus such information is not widely available. The information is preferably provided to the first party as well, and potentially other entities.

In one embodiment of the present invention, a method for rewarding educational accomplishment includes: providing an educational activity to a user; providing one or more points to the user for achievement by the user of a goal within the educational activity; determining a monetary value of the one or more points; and establishing a relationship with a second party to have the second party create and manage an account that allows the user to apply the monetary value to purchase items from third parties, wherein the second party: secures payment to the third parties for the items the user purchases with the account; and receives, from the third parties, information associating the user with the items the user purchases.

The method may further include receiving information regarding the user's purchasing desires. The method may further include providing the information regarding the user's purchasing desires to the second party.

The method may further include receiving, from the second party, the information associating the user with the items the user purchases. The method may further include creating a purchase history file with the information associating the user with the items the user purchases. The method may further include receiving information regarding the user's purchasing desires and adding the information regarding the user's purchasing desires to the purchase history file to create a preferences file.

The information associating the user with the items the user purchases may be used to provide targeted advertising to the user.

In another embodiment a system for rewarding educational accomplishment includes: an educational activity that provides points for achievement within the educational activity, wherein the points are redeemable for items; a first party that organizes and manages the educational activity; a user who engages in the educational activity and receives one or more of the points after the user achieves one or more goals within the educational activity; and a second party that establishes a relationship with the first party to have the second party create and manage an account that allows the user to apply a monetary value associated with the points to purchase items from one or more third parties, such that the second party is adapted to: secure payment to the one or more third parties for the items the user purchases; and receive, from the one or more third parties, information associating the user with the items the user purchases.

The system may further include user purchasing desires that are supplied by the user to the first party. The user purchasing desires may be accessed by the second party.

The first party in the system may be adapted to receive, from the second party, the information associating the user with the items the user purchases. The first party may further be adapted to create a purchase history file with the information associating the user with the items the user purchases. The first party may be further adapted to receive information regarding the user's purchasing desires and add the information regarding the user's purchasing desires to the purchase history file to create a preferences file.

In either (or both) of the above embodiments, any of the following may be included:

The user may not be eligible to open a credit account. The user may be a child.

The educational activity may be an educational game. The educational game may incorporate instruction that aids achievement on standardized state exams.

The second party may be a major financial services company.

The second party may provide, or be adapted to provide, fraud protection to the account and the purchases of the items.

In another embodiment, a system for rewarding educational accomplishment includes: means for providing an educational activity to a user; means for providing one or more points to the user for achievement by the user of a goal within the educational activity; means for determining a monetary value of the one or more points; and means for establishing a relationship with a second party to have the second party create and manage an account that allows the user to apply the monetary value to purchase items from third parties, wherein the second party: secures payment to the third parties for the items the user purchases with the account; and receives, from the third parties, information associating the user with the items the user purchases.

BRIEF DESCRIPTION OF THE DRAWINGS

The detailed description is better understood in conjunction with the accompanying drawings, in which like reference characters represent like elements, as follows.

DETAILED DESCRIPTION OF THE PREFERRED EMBODIMENTS

Figure 1:
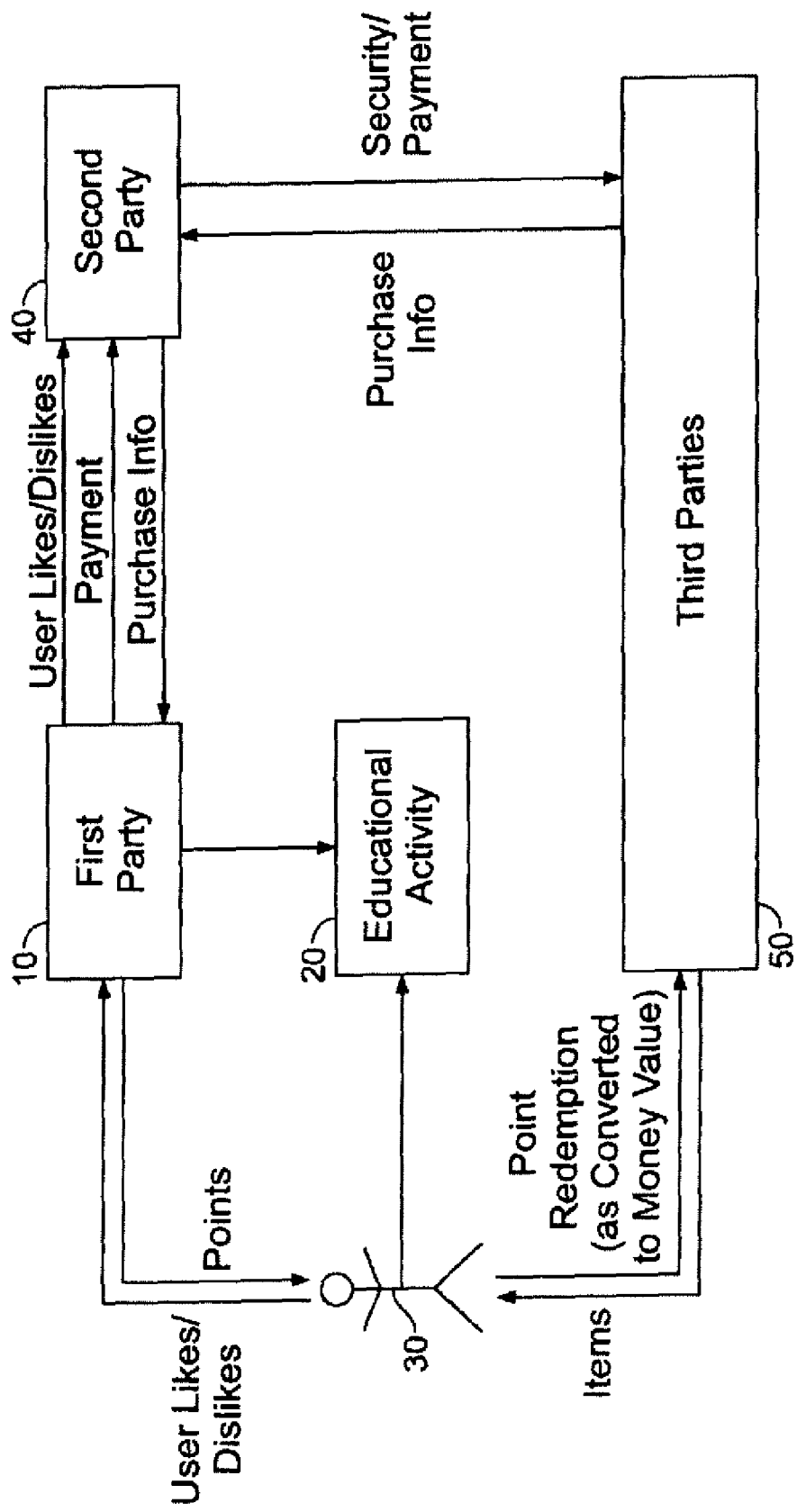
FIG. 1 is a block diagram of an embodiment of a system and method for rewarding educational accomplishment, in accordance with the present invention.

The present invention relates to a system and method for rewarding educational accomplishment. In a preferred embodiment as shown in FIG. 1, a first party 10 provides educational activity 20 to one or more users 30, who participate in the activity. First party 10 may be, for example, a company that organizes and manages operation of the present invention. First party 10 may be the developer of educational activity 20, or it may work with other entities to develop or organize educational activity 20. Educational activity 20 may be, for example, the attending of a museum or certain classes at a secondary school, completion and handing in of homework, passing educational tests within the context of a computer game, or other educational achievement-oriented activities. Users 30 are preferably people who are ineligible for or otherwise do not have credit accounts in which the account providers can track their purchases. Users 30 may be, for example, child students, who are not eligible to open credit accounts such as major credit card accounts through major financial services companies such as Visa or Mastercard. Children are those people who are under 18 years of age, the earliest age in which children qualify to open most credit accounts. Before children reach 18 years of age, they may not be able to qualify to open credit accounts because of age constraints on legally entering contracts, and/or age requirements provided by the credit accounts. In some implementations, however, users 30 may simply be people who do not have a credit account.

When a user 30 participates in educational activity 20, he or she is provided points for achieving certain goals within the activity. For example, user 30 may obtain points by correctly answering 80% of the questions on a computerized mathematical test provided by first party 10 through the Internet. In this example, first party 10 may determine that, based upon the difficulty and length of the test, user 30 will receive five points. First party 10 preferably determines relative points values of the educational activities 20 by consulting with top psychologists and other experts in the field of education. User 30 may continue to participate in educational activity 20 to achieve further goals, thus obtaining more points, such as by answering 80% of the questions on additional computerized mathematical tests. First party 10 preferably keeps a record of the total points that user 30 accumulates.

Points may be provided to users 30 in various ways. In one implementation, users 30 are provided cards, such as credit cards, which may be swiped at "card swipers" (such as the machinery commonly employed at retailers to charge credit cards and debit bank cards) or other point-of-sale devices located at, e.g., school classrooms or museums, to record the achievement of goals within educational activities 20. However, in other implementations, point earning may be recorded in other ways, such as by use of a watch with a transponder, through the establishment and maintenance of an account of user 30 on a computerized system such as the Internet, or by phone or U.S. mail. Preferably, the card (or other device) is the same card used to make purchases at third parties 50, as described below.

Once user 30 has accumulated a certain number of points, he or she may redeem them for purchases or discounts on purchases at third parties 50. Third parties are preferably merchants or other businesses that sell items, such as goods and/or services, to the public, but may be any entity from which purchases may be made. Third parties 50 may include, for example, book stores and online (i.e. Internet) gaming companies. Preferably, first party 10 establishes a relationship with one or more second parties 40 to manage these transactions. A second party 40 is preferably a business that offers and manages credit accounts and produces (or has produced for it) accompanying credit cards that may be swiped at "card swipers" (such as the machinery commonly employed at retailers to charge credit cards and debit bank cards) or other point-of-sale devices.

In an advantageous implementation, second party 40 is a major financial services company, such as credit card company or Mastercard or financial services company First Data Corporation, which creates a credit account for each user 30. In this implementation, first party 10 preferably first determines a monetary value for the points earned by user 30, such as a value in U.S. dollars. Various methods of determining this monetary value may be employed, and may be standard for all points of all users, or may be customized with respect to specific users 30.

For example, the monetary value of the points a user 30 has earned for a particular educational activity 20 may be partially or fully determined based upon money a money places on his or account for that activity. For instance, a parent may place twenty dollars on the account of his child, user 30. If the child engages in the particular educational activity 20 and performs well enough to receive half of the total possible points, he is provided half the twenty dollars, or ten dollars, that may be used for purchases. The parent may have the other ten dollars applied to other educational activities 20, or possibly withdrawn from the account.

Funding from outside sources may also add to the monetary value of an account. For example, first party 10 or another party managing the present invention may sell advertising space on marketing or other material. Funding may also be received in the form of government grants or from other sources. The funding from outside sources may be allocated among all the educational activities 20 and/or their associated goals, and thus all points awarded to all users. Thus, for example, the user 30 may earn twenty points during a certain period that 2000 total points are awarded to all users, or one percent of the total points awarded. If 1000 dollars is received by first party 10 from outside sources during this period, first party 10 may allocate this money among all points earned, thus allocating one percent, or ten dollars, to the account of user 30. If user 30 has already earned ten dollars for these points based upon money placed into his or her account by a parent, user 30 will now have twenty dollars in the account usable for purchase. Thus, the twenty points earned will have a total value of twenty dollars, or one dollar per point. In other embodiments, the monetary value of each point may be predetermined, and the number of points awarded in educational activities 20 adjusted based upon the money available for the accounts.

In one example, a user 30 may earn twenty-five points by completing five goals (at five points per goal) within an educational activity 20. First party 10 determines the monetary value of each point, forty cents in this example (which may apply to all points earned by all users 30), then multiplies that value by the twenty-five points earned, to arrive at ten dollars worth of points. First party 10 sends this information to second party 40, which updates the account of that user 30 to reflect an additional ten dollars worth of credit. Preferably, second party 40 manages this account like a stored value card. Stored value accounts are accounts in which only money already funded into the account by the accountholder may be applied to purchases. Examples of stored value accounts are prepaid card accounts and debit accounts with banks. The operation of stored value card accounts are known in the art, and are incorporated herein by reference.

Thus, for example, if Mastercard were second party 40, user 30 would now have an additional ten dollars in his or her account to be spent at any of the over 28 million locations worldwide that accept Mastercard's credit, and in any way (e.g. through the Internet, phone, or by swiping a Mastercard-aligned card through a card swiper) the credit may be spent. However, other ways of operating such an account, consistent with the present invention, may also be employed.

Employing a major financial services company as second party 40 in the present invention facilitates increased motivation of users of the system to improve their level of education. As noted above, major financial services companies typically have relationships with millions of merchants. It is these relationships that allow the present invention to offer a virtually limitless array of incentives for the user. The nearly universal acceptance of the points (in the form of a monetary value, as described above) allows users to freely pursue and choose rewards that they most desire. For example, a child user 30 who loves music will have great incentive to achieve goals within an educational activity 20, since the determined monetary value of the points the child earns from that achievement may be applied toward the purchase of compact discs of his or her favorite artists at a Tower Records store.

An implementation including a major financial services company as second party 40 provides another significant advantage, since first party 10 (or another party managing operation of the present invention) need not establish relationships with any third parties 50, such as merchants or other entities, before users 30 can purchase items from them. Third parties 50 need only accept the credit of second party 40. Major financial services companies are particularly advantageous as second parties 40, since they secure the payment of the credit they provide via, e.g., fraud protection and payment guarantees, and so third parties 50 regularly accept the credit. For example, major financial services companies, such as credit card companies Visa and Mastercard, offer enough security that they will have the amounts they provide credit for paid off (e.g. by them or a bank), that merchants and other third parties 50 almost universally accepted their credit. In a more specific example, credit cards and debit cards aligned with Mastercard offer liability protection for unauthorized transactions as well as guarantees of credit reimbursement, and are accepted for purchases at over 28 million locations. Additionally, major financial services companies are so prominent in the industry that merchants or other businesses risk losing business by not accepting the credit for transactions. Thus, where second party 40 is Mastercard, every one of the over 28 million merchants that accept Mastercard's credit will accept user 30's points in their determined dollar value in user 30's Mastercard-aligned account, and need not even realize they are acting as a third party 50 in the present invention.

Conversely, existing educational rewards systems that include redemption of actual points (i.e. in point form) to make purchases are far less established, if at all. In these systems, merchants will have to independently agree to accept points for the items they offer before becoming part of the systems. The merchants will have to create specific business plans for the recordation of redeemed points and the reimbursement, by the business managing the system, for the items they offer. Additionally, the merchants may be hesitant to accept such "credit" from a business that may provide little assurance that it will not fail and thus default on promises of payment of the credit.

In another implementation, second party 40 (alone or in addition to other companies, such as Visa or Mastercard) is a corporation, like First Data Corporation, that allows its accounts to be controlled such that purchases can only be made with certain merchants or other entities. For example, where user 30 is a child who has an account (that manages the monetary value of his or her earned points) with First Data, the account may allow his or her parents to limit purchases made with the account to certain merchants. Thus, for example, a parent may limit his or her child's account so that no items may be purchased from merchants offering items with "mature" content.

Payment to second party 40 for the credit it provides through accounts of users 30 may be made in various ways. For example, payment may be made via a recurring charge to parents for their children's participation as users 30 in the present invention, a charge to the parents based upon the number of points their children obtain, a government grant, and/or earnings by first party 10 from use or sale of information associating users 30 with items users 30 purchase (this information is described further below).

The present invention provides significant advantages to entities to become second parties 40. By managing accounts (of monetary values determined from points) of users 30 as described above, second parties 40 obtain information associating each user 30 with the items, such as goods and services, that user 30 purchases using the account. This information is supplied to second party 40 by each third party 50 from which user 30 purchased items. This transfer of information is well known in the art of credit account management, such as that conducted by Visa, Mastercard, and First Data, and is incorporated herein by reference. Information associating user 30 with the items user 30 purchases is valuable, since it can be analyzed to determine purchasing preferences of user 30, and to create a purchase history file for each user 30. Information regarding the purchasing preferences is very valuable, since it can be, for example, sold and/or used to target advertising to a user 30 based upon his or her purchasing preferences. For example, merchants or other entities may be willing to purchase this information, since it may identify potential buyers of the items they offer. Because of this value, second parties 40 may not require payment, or provide a discount, to create and manage accounts of users 30 in accordance with the present invention.

In a preferred implementation, some or all users 30 are ineligible (e.g. children) for some or all, or otherwise do not have, other credit accounts in which the account providers track their purchases. Ineligibility, as explained above, may be based upon legal age barriers and/or credit account-provider preferences. Thus, the purchase information obtained here is very rare, possibly the only existing information of its kind for a particular child or other user, significantly increasing its value. Thus, where the users 30 are children, second party 40 would be able to create a database of specific children's buying habits, or a purchase history file, providing evidence of the types of items the children desire and will desire in the future. The raw information associating the user 30 with the items he or she purchases may also be sold to other companies for purposes such as those described above. The value of this information provides great incentive for an entity, such as a major financial services company like Visa, Mastercard, or First Data, to become a second party 40 in the present invention.

Preferably, as part of the relationship between first party 10 and second party 40, second party 40 agrees to send, to first party 10, the information associating each user 30 with the items that user 30 purchases. First party 10 may then use or sell this information such as described above. However, in one implementation, first party 10 may be a company that can provide credit account services such as those of major financial services companies, as described above. In this case, first party 10 may perform the functions described above of both first party 10 and second parties 40.

In one implementation of the above embodiment, first party 10 obtains information from user 30 regarding the likes and dislikes, or purchasing desires, of user 30. For example, first party may provide a questionnaire to user 30, via the Internet or U.S. mail, that asks user 30 what his or her hobbies are and what purchases he or she has recently made. The completed questionnaire may be collected by first party 10 and offered to second party 40 as an additional incentive to maintain a relationship with first party 10 in the context of the present invention. The information the questionnaire contains on user 30 may be combined with the information regarding that user's purchases, or purchase history file as described above, to create a more comprehensive preferences file of user 30. Where first party 10 receives information associating user 30 and the items user 30 purchases, as described above, either first party 10 or second party 40 or both may create the preferences file. The raw information may also be sold or otherwise provided to another party to create the user preference file. The preferences file and/or the associated raw information will be even more comprehensive, and thus more valuable, than just that of the purchase information of user 30, and can similarly be sold or used for advertising purposes.

In another implementation, one or more third parties 50 establishes special relationships with first party 10, agreeing to provide discounts on their items, in exchange for advertising their businesses to users 30 or receiving information regarding the users 30, such as preferences files. For example, if educational activity 20 includes the computerized mathematical test provided through the Internet as described above, an advertisement of a third party 50 may appear on the web pages user 30 accesses to take the test. If educational activity 20 involves a public place, such as a museum, a third party 50 may sponsor points (through discounts on items they offer) there in exchange for the right to advertise on location. However, other methods of advertising may also be employed, such as providing advertisements with marketing material of first party 10, or any other methods known in the art of advertising, which are incorporated by reference herein.

Figure 2:
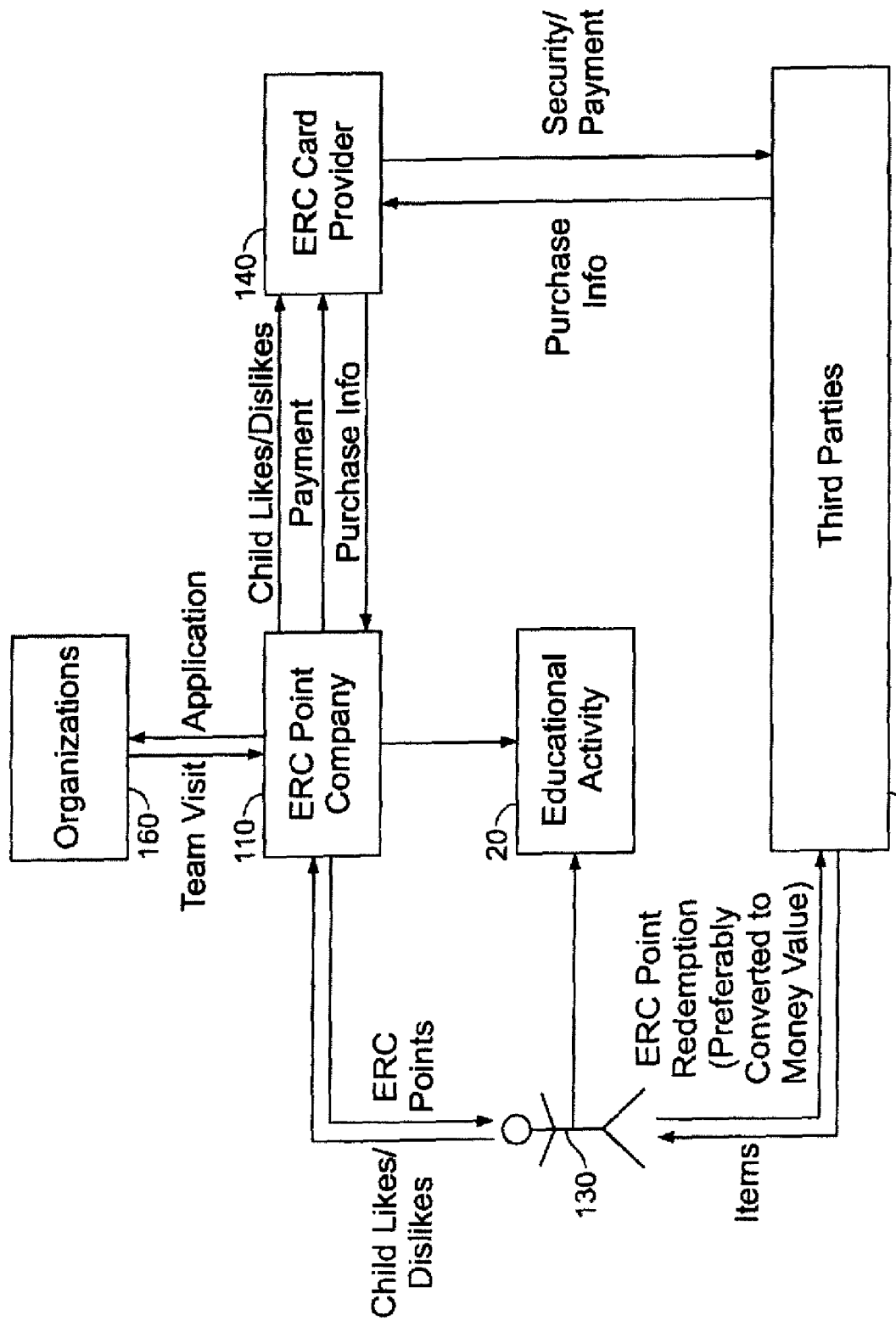
FIG. 2 is a block diagram of one implementation of an embodiment such as the system and method for rewarding educational accomplishment of FIG. 1, in accordance with the present invention.

Turning to FIG. 2, an example of the embodiment described in FIG. 1, called the Education Rewards Collection (ERC) System, is provided. This system is designed preferably for children, empowering them by offering a new way to earn credit towards the purchase of items. In this example, someone (e.g. the child, a parent, a relative, a friend) enrolls a user 30, preferably a child 130 here, in the ERC System, proactively or after an offer to join is sent to the child and/or parent. For example, a web site may be created, which the child 130 or parent may access via the Internet to create a child account with the ERC System. Alternatively, where child 130 does not have ready access to the Internet, he or she may enroll by U.S. mail or phone. Enrolling may require a subscription fee, which may include a periodic fee plus future additional costs for usage of the ERC System over a certain number of hours. This fee preferably is used to fund purchases made by users 30 in the context of the present invention. Other ways of funding purchases, such as described above with respect to FIG. 1, may alternatively or additionally be employed. ERC Point company 110 (described below) may manage the movement of these funds, or the management may be outsourced to a bank or other entity. Once the child is enrolled, the child and/or parent approves the receipt of an "ERC Card," which is a card the child can use to redeem any points, here "ERC Points," he or she accumulates.

Preferably, the ERC Card is provided by an "ERC Card Provider" 140, the second party 40 in this embodiment. The ERC Card Provider 140 is preferably a business that is responsible for producing the ERC Card and providing card swipers to "strategic partners," or organizations such as third parties 50. The ERC Card preferably functions like a credit card: it can be swiped at a card processing facility to access the child's account (and thus the child's accumulated points) and to deduct points ERC Points that the child uses to purchase an item, such as a good or service, from a third party 50. However, the ERC Card could be something that functions equivalently to a credit card, such as a watch with a transponder. Additionally, the ERC Card Provider 140 preferably secures the value of the ERC Points.

Preferably, ERC Card Provider 140 is a major financial services company, and can secure payment to third parties 50 for the credit (associated with earned ERC Points) they provide for purchases, such as described above with respect FIG. 1. For example, ERC Card Provider 140 may support the ERC System with a card processing facility (which is somewhat equivalent to, or may be, a credit card processing facility) that facilitates fraud protection and the storing, tracking, and redemption of earned ERC Points. In one implementation, ERC Card Provider 140 is a major financial services company that manages ERC Points in their determined monetary value in a user account, such as described above with respect to FIG. 1, including securing payment for items purchased using the account. Thus, millions of merchants would already be established as ERC Point "accepting" (i.e. they accept the points as converted to Mastercard or First Data credit) locations, whether they are aware.

In this example, a child 130 obtains ERC Points by successfully achieving goals with educational activities 20 that are deemed by the "ERC Point Company" 110, which is the first party 10 (or a part thereof) in this implementation, to include educational components. ERC Point Company 110 preferably organizes and manages operation of this example of the present invention, and may be a company such as Tabula Digita, Inc. The activities may include standard school-related activities such as attending class, and/or handing in homework on time. The activities may also include those that are "above the call of duty," such as visiting a museum or library, watching educational television shows, or attending a cultural play. Other educational activities 20 may include educational games, such as those the ERC Point Company or another party provides and which, in an entertaining way, teaches skills necessary for passing state exams. One example is an Adventutainment™ game offered by the company Tabula Digita, Inc., as described below. Points may also be awarded for exceptional performance in standard activities or other educational activities the child is required or likely to engage in, such as the taking of a test.

Points may be awarded in various ways. For example, where children 130 are provided points for attending a class, they may swipe their ERC Cards at a card swiper positioned in the classroom. Points may also be awarded over the Internet, where points are earned while engaging in an educational activity 20 online.

Preferably, the ERC Point Company 110 verifies the child's satisfactory completion of the educational activity 20 before the points are awarded. In this example, a child 130 signs on to the system of the present invention by connecting with a central database, such as a computer database which contains information regarding children's accounts and ERC Points earned and spent, and is accessible via the Internet. The database is preferably managed by ERC Point Company 110, but may be outsourced instead. The child 130 signs up for the specific educational activities 20 he or she plans to engage in. In other embodiments, the child 130 may sign on at the school he or she attends, sign up with or without parent approval, or have the parent sign the child up. The signing on may also automatically provide points to the child, for example where swiping a card at the entrance to a classroom evidences attendance of the class inside. There, the goal of attending the class is the entirety of educational activity 20. Alternatively, the child may have to complete goals within educational activity 20 after signing on. This may include completing part or all of the activity and then answering a set of questions designed to show that the child 130 engaged in the activity and learned the material, as described below. It may alternatively or additionally include some verification of completion of goals within educational activity 20 by the parent or teacher. Where the child completes one or more goals within educational activity 20 after signing on, the child 130, parent or a teacher verifies completion by signing on to the system again and providing follow-up information, such as answers to the set of questions. In any case, once completion of one or more goals within educational activity 20 by the child 130 is verified by the system, the system updates the central database to add the earned ERC Points to the child's account.

In the example, although select strategic partners may initially be targeted for inclusion in the present invention, any organization 160 can apply to ERC Point Company 110, to have any number of the activities it sponsors be deemed educational activities 20. There are a number of ways an organization 160 can apply for the points, and thus have an activity assigned an ERC Point value. For example, an organization 160 may complete a category sheet that ERC Point Company 110 sends it upon request. A category sheet is preferably a paper outlining the different categories the activity must be rated in to become an educational activity 20. For example, the categories may include an amount of reading involved or the time spent on the activity. Organization 160 completes and submits the category sheet, preferably along with a description of the activity, to ERC Point Company 110 for evaluation. ERC Point Company 110 then evaluates the submitted material, calculating the total number of ERC Points, if any, the activity or goals within the activity are worth, based on an equation that weights the individual components, or categories, described on the category sheet. ERC Point Company 110 also formulates criteria for earning ERC Points. Although different ways of earning points may be devised, in this example ERC Point Company creates a sheet, book, or a website (e.g. new website or page within an existing website that ERC Point Company 110 has already created) that includes questions related to the activity. Thus, successful completion of one or more goals within educational activity 20 here entails answering some or all of the questions correctly. By correctly answering the required number of questions, the child 130 shows that he or she attended or engaged in the activity. Thus, educational activity 20 here includes both attending or engaging in the activity organization 160 offered and successfully answering the associated questions. However, other ways of successfully completing goals within educational activity 20 may also be employed, such as verification of the child's completion by a parent or teacher, without the child having answered post-activity questions.

An organization 160 may also apply to have a team representing ERC Points Company 110 visit its business to assess the point value of its activities. In this example, the team visits organization 160 and assesses its activities. The team then submits a report to ERC Point Company 110, recommending one or more (if any) activities for assignment of a suggested number of ERC Points. ERC Point Company 110 then evaluates the report and creates a sheet, book, or website for testing a child 130 who participates in the activities, as described above.

Advantages to an organization becoming organization 160 within the context of the present invention are significant.

They include increased traffic to the locations of their businesses, since children 130 will want to obtain ERC Points, and the ability to market themselves as supporters of education.

Preferably, ERC Point Company 110 determines the number of ERC Points allotted to each goal within an educational activity 20. ERC Point Company 110 preferably uses a proprietary effort equation or other standard for calculating ERC Points. The proprietary effort equation may include calculation of points based upon the goal's individual components. Components may include, for example, the amounts of reading involved, amount of math, amount of intuitive reasoning, and the amount of time necessary for completion of the goal. ERC Point Company 110 preferably develops these components, and their relative importance, in conjunction with top educators and psychologists, to determine the overall ERC Point value of each goal. Thus, in the examples above, ERC Point Company 110 would work with the educators and psychologists to assign a certain number of ERC Points to individual components of the goals within an activity an organization 160 submitted for point qualification. The point value of each component would then be summed to arrive at a total number of ERC Points for completion of that goal along with any associated ERC Point Company-created questions.

The standard for determining points may be further tailored based upon developing research regarding the relative importance of the components, or determined in other ways that meet the needs of the present invention. For example, the calculation of ERC Points may include the performance on and time spent to complete a goal by a child 130 as compared to other children 130 and/or past performances by child 130.

These point-determining criteria, including the proprietary equation, may be applied alone or with other criteria to determine the monetary value associated with the points. Various criteria may thus, for example, be applied to determine monetary values of the points based upon relative point values of goals and funds provided from outside sources. Alternatively, monetary values may be applied to goals within educational activities 20, and relative numbers of points assigned to the goals based upon their relative monetary values. The monetary value (or potential monetary value) of a point or activity may also be tailored for each user 30, such as where a parent funds his or her child's account, or based upon other criteria.

Once the child 130 earns and obtains a certain number of ERC Points, as described above, he or she may redeem them at third parties 50. Preferably, the child 130 could purchase any item that third party 50 offers, such as any toy from Toys"R"Us or clothing from a department store. Alternatively, prior parent approval of a product or product category, or spending level, may be required before ERC Point redemption. One way of facilitating this parental oversight is by employment of a major financial services company such as First Data, as described above, as ERC Card Provider 140.

ERC Points may be redeemed, for example, by swiping a child 130's ERC Card at a card swiper located at a third party 40. As with credit card swipers, swiping the ERC Card identifies the child 130 and his or her status, in this case the number of ERC Points (preferably converted here to a dollar or other monetary value) he or she has. Preferably, the child 130 and status are identified by electronically accessing a database, such as the central database described above, or an electronic database controlled by a major financial services company as ERC Card Provider 140. If the child 130 has enough points (or money where the points are converted) to purchase the item he or she desires, the purchase is approved, preferably automatically by ERC Card Provider 140, and the points (or money) are deducted from the account of the child 130.

ERC Card Provider 140 may obtain the information associating the child 130 and the purchases of child 130 directly from the third party 50 when a purchase is made by a child 130. As described with respect to second party 40 in FIG. 1, such access provides great incentive to a business to become ERC Card Provider 140 in the context of the present invention. Additionally, ERC Card Provider 150, by aligning itself with the ERC System, increases its exposure to parents of children 130. This may encourage the parents to open accounts or otherwise transact business with ERC Card Provider 150. Preferably, an agreement has been made between ERC Points Company 110 and ERC Card Provider 140 to have ERC Card Provider 140 forward the information associating the child 130 and the purchases of child 130 to ERC Points Company 110.

Figure 3:
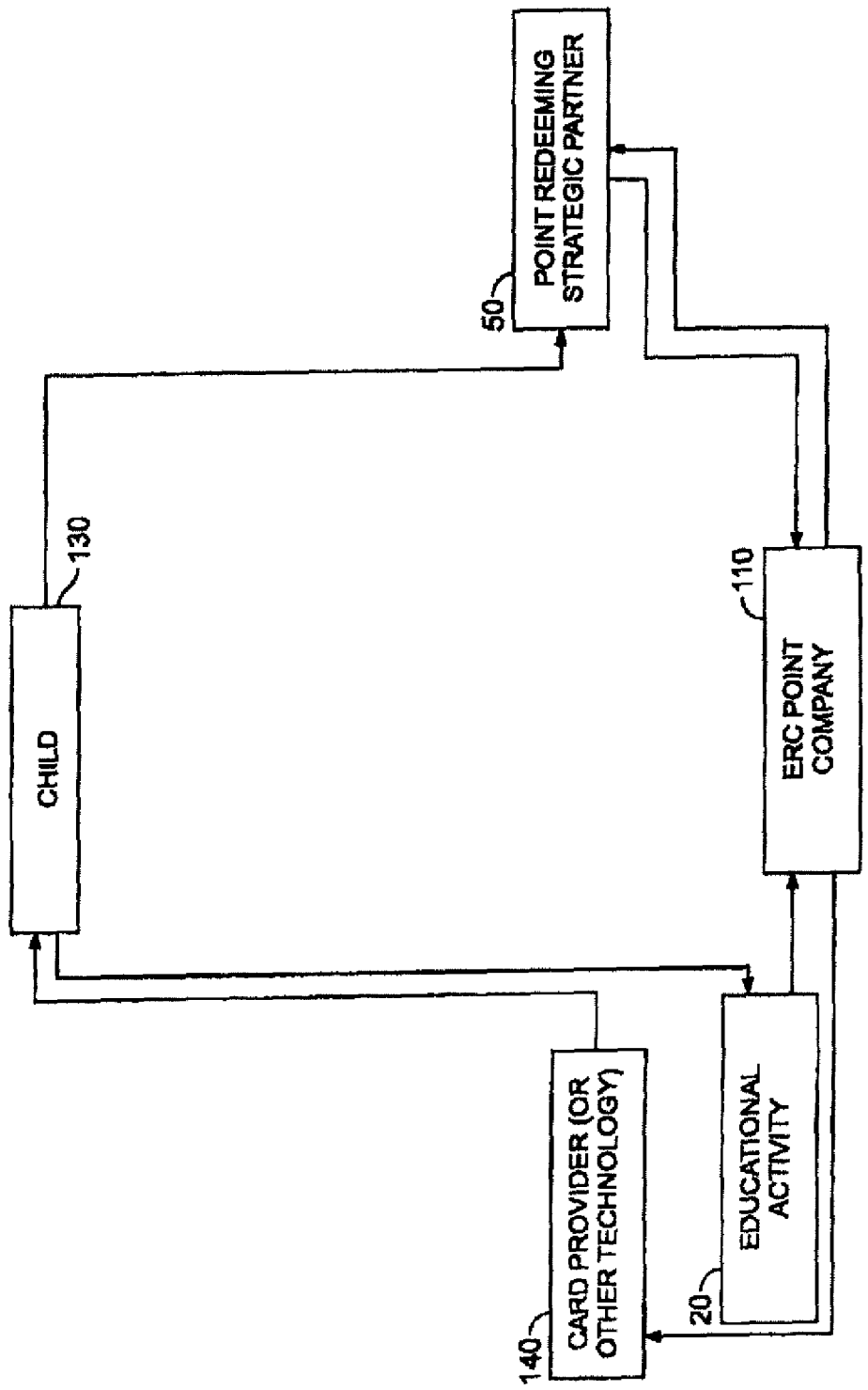
FIG. 3 is a block diagram describing some details applicable in one example of a system and method for rewarding educational accomplishment such as shown in FIG. 2, in accordance with the present invention.
Figure 4:
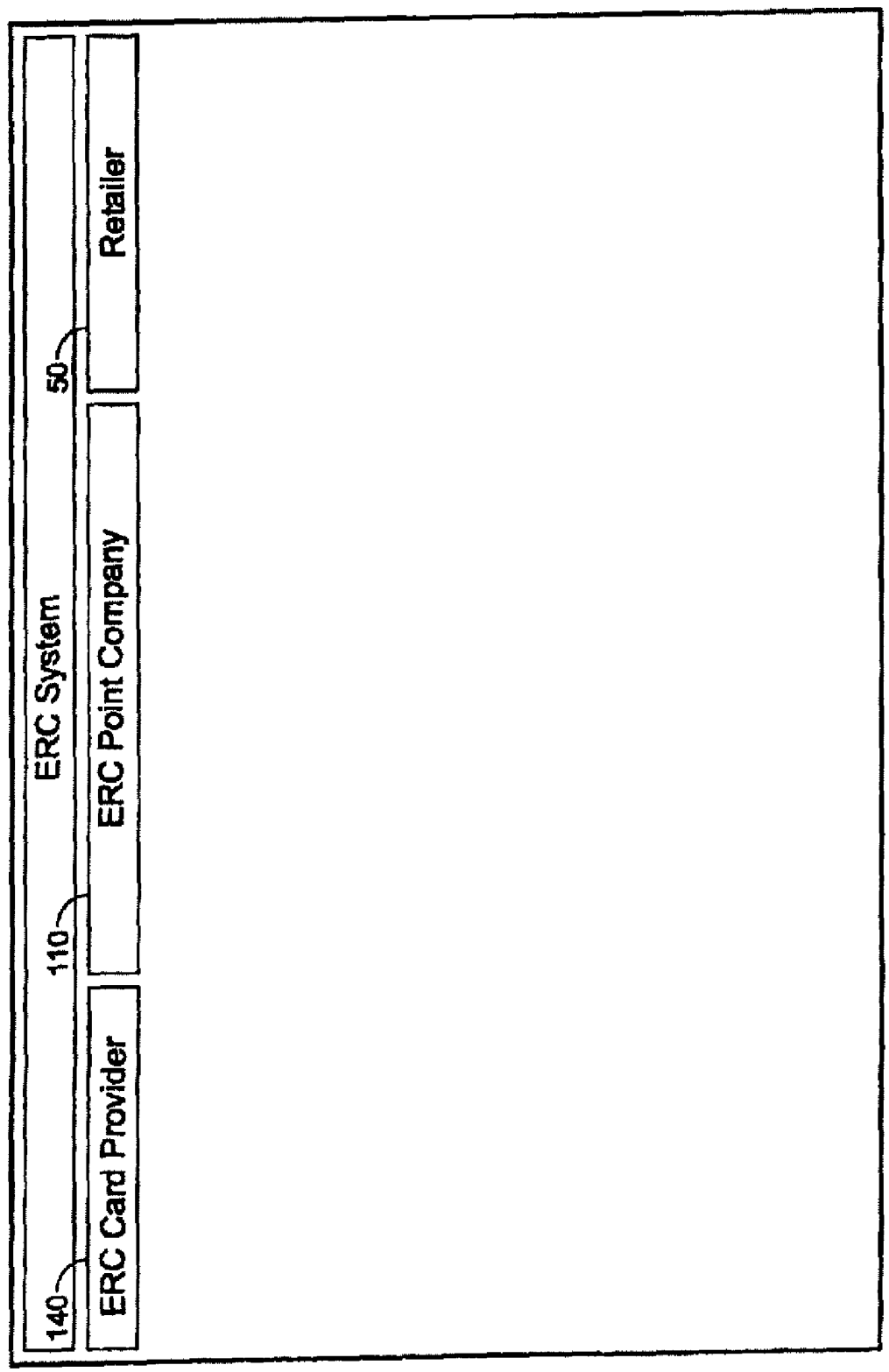
FIG. 4 is a table describing some functions that some components of an example of a system and method for rewarding educational accomplishment may provide, in accordance with the present invention.

Some of the details applicable in one example of the ERC System is shown in FIG. 3. Some functions that ERC Point Company 110, ERC Card Provider 150, and third party 40 may provide in one example are described in FIG. 4.

In one embodiment of the ERC System, one or more third parties 50 establish special relationships with ERC Point Company 110, providing discounts to children 130 on the items they sell. Thus, for example, a third party 50 may agree to provide discounts based upon advertising its products and services to the children 130, such as described above with respect to FIG. 1, increasing consumer awareness in specific children through a targeted advertising campaign, especially to high spending consumers (in terms of their individual buying power and buying power of parents that they influenced), and/or publicly linking its business with the ERC System, and thus, education. Additionally, other strategic partners, such as a government, may decide that educating children in such a system is valuable, and agree to financially supplement the value of the ERC Points. A third party 40 may also accept a monetary value of the points up to a certain percentage discount on its items, or other arrangement as described above with respect to FIG. 1.

In another embodiment of the ERC System (applicable to any other implementations, such as those described with respect to FIG. 1), ERC Point Company 110 offers an option, possibly to the parents of child 130, of monitoring and influencing the "well-roundedness" of the education the child 130 is obtaining through use of the System. For example, a child who loves mathematics and hates reading may gravitate towards mathematics-related activities to earn ERC Points while completely neglecting reading-related activities. ERC Point Company 110 may provide the option of requiring a child 130, over time, to earn more ERC Points in reading-related activities (or other educational areas) in order to be allowed to redeem the ERC Points. ERC Point Company 110 may also customize the delivery of an educational activity 20 based upon the personality of the child 130, so that the experience of the child 130 is most conducive to his or her absorption of the activity's information. ERC Point Company 110 may facilitate brain-mapping or other current psychological or educational models to aid in this customization.

In one implementation of any of the embodiments above, educational activity 20 is an educational game. Preferably, the educational game is a computer game that is PC-compatible or playable on a popular gaming system, such as Sony PlayStation 2. In one implementation, the game is offered over the Internet to those with broadband connections. Preferably, the educational game integrates an educational subject, such as mathematics, into a complex computerized game. For example, the educational game may integrate math questions that are geared to aid achievement on standardized state exams into three-dimensional gaming storyline, interactivity, and surround sound. The math questions may be, for example, questions that appeared previously on a standardized state exam. The gaming element is preferably created by, or in conjunction with, an experienced computer game designer and manufacturer.

An example of such a game is an Adventutaimnent™ game offered by Tabula Digita, Inc., such as Dimenxia™. Dimenxia™ incorporates a mathematical curriculum, for example algebra, covering an entire year's studies into a complex game with three-dimensional images and involved storylines. The curriculum is preferably created in consultation with experts in the field of education so that a user can obtain the most relevant math skills, including those needed to excel in standardized state exams. The game provides an interactive adventure/puzzle concerning three college-age students caught up in a conspiracy. A user 30 attempts to resolve the conspiracy, with clues being provided in the form of puzzles that require use of algebra, for example, to solve. A user 30 who cannot complete the algebraic step may consult another portion of the game which provides instruction related to that step. User 30 may then return to the step to complete it. When a user 30 correctly completes a certain number of algebraic steps, and thus one or more goals, he is awarded one or more points, depending upon the difficulty of the goal. As explained above, user 30 may then redeem the points with a third party 40.

Dimenxia™ also monitors the progress of each user 30 and provides reports identifying topics mastered, as well as any weaknesses and associated remedial recommendations. The reports may be accessed by user 30, and preferably also the parent and teachers of user 30.

While the foregoing description and drawings represent the preferred embodiments of the present invention, it will be understood that various additions, modifications, and substitutions may be made without departing from the spirit and scope of the present invention as defined in the accompanying claims. In particular, it will be clear to those skilled in the art that the present invention may be embodied in other specific applications, methods, forms, structures, arrangements, proportions, and with other elements, materials, and components, without departing from the spirit or essential characteristics of the invention. For example, in one implementation of any of the embodiments above, points may be earned for accomplishments which are not educational, such as those involving music, sports, video gaming, or other activities engaged in by users ineligible for, or otherwise not having, credit cards or other credit accounts.

Although the present invention has been primarily described within the context of educating children, it is also contemplated that the present invention may be applied to numerous other learning contexts such as, for example, college and graduate schools, employee training programs, and professional and continuing education programs. Numerous other alternatives, modifications, and variations will be apparent to those skilled in the art in light of the foregoing description.

It will also be appreciated that features described with respect to one embodiment typically may be applied to another embodiment, whether or not explicitly indicated. The various features described may be used singly or in any combination. The presently disclosed embodiments are therefore to be considered in all respects as illustrative and not restrictive, the scope of the invention being indicated by the appended claims, and not limited to the foregoing description.

The invention claimed is:

1. A system for rewarding educational accomplishment, comprising:
   a computing device coupled to a communications network, the computing device comprising means for:
   providing one or more educational questions to a user;
   receiving an answer from the user to each of the one or more questions;
   determining if the answer is correct;
   awarding one or more points if the answer is correct;
   transmitting information containing the one or more points to a system owned by a financial services company, the system owned by the financial services company comprising means for:
   managing an account that identifies the user;
   allowing the user to apply a monetary value associated with the received one or more points to purchase items from a third party vendor,
   securing payment to the third party vendor for the items the user purchases with the account; and
   receiving directly from the third party vendor, information associating the identification of the user with the items the user purchases.

2. The system of claim 1 wherein the computing device further comprises means for monitoring a progress of the user.

3. The system of claim 2 wherein the computing device further comprises means for:
   determining an educational strength or educational weakness of the user and
   providing remedial recommendations based on the educational weakness of the user.

4. The system of claim 2 wherein the computing device is further comprises means for awarding the one or more points based on a difficulty level of the corresponding question.

5. The system of claim 2 wherein the computing device is further comprises means for presenting the user with instructions to solve the one or more questions.

6. The system of claim 2 wherein the computing device is further comprises means for providing a report on the progress of the user, wherein the report identifies the educational strength or educational weakness of the user and the remedial recommendations based on the educational weakness of the user.

7. The system of claim 2 wherein the one or more questions involve math skills needed to excel in standardized state exams.

* * * * *